Dec. 5, 1961  W. G. FASTIE  3,011,391
HIGH SPEED PLANE GRATING SPECTROGRAPH AND MONOCHROMATOR
Filed July 29, 1959  9 Sheets-Sheet 1

INVENTOR.
William G. Fastie
BY
Walter G. Finch
ATTORNEY

Dec. 5, 1961 W. G. FASTIE 3,011,391
HIGH SPEED PLANE GRATING SPECTROGRAPH AND MONOCHROMATOR
Filed July 29, 1959 9 Sheets-Sheet 3

INVENTOR
William G. Fastie

BY Walter G. Finch
ATTORNEY

Dec. 5, 1961 W. G. FASTIE 3,011,391
HIGH SPEED PLANE GRATING SPECTROGRAPH AND MONOCHROMATOR
Filed July 29, 1959 9 Sheets-Sheet 4

INVENTOR
William G. Fastie
BY Walter G. Finch
ATTORNEY

Dec. 5, 1961  W. G. FASTIE  3,011,391
HIGH SPEED PLANE GRATING SPECTROGRAPH AND MONOCHROMATOR
Filed July 29, 1959  9 Sheets-Sheet 6

INVENTOR
William G. Fastie

BY Walter G. Finch
ATTORNEY

Dec. 5, 1961 W. G. FASTIE 3,011,391
HIGH SPEED PLANE GRATING SPECTROGRAPH AND MONOCHROMATOR
Filed July 29, 1959 9 Sheets-Sheet 7

INVENTOR
William G. Fastie

BY Walter G. Finch
ATTORNEY

Dec. 5, 1961  W. G. FASTIE  3,011,391
HIGH SPEED PLANE GRATING SPECTROGRAPH AND MONOCHROMATOR
Filed July 29, 1959  9 Sheets-Sheet 8

INVENTOR
William G. Fastie
BY Walter G. Finch
ATTORNEY

Dec. 5, 1961 W. G. FASTIE 3,011,391
HIGH SPEED PLANE GRATING SPECTROGRAPH AND MONOCHROMATOR
Filed July 29, 1959 9 Sheets-Sheet 9

FIG. 14

INVENTOR
William G. Fastie

BY Walter G. Finch
ATTORNEY

United States Patent Office 3,011,391
Patented Dec. 5, 1961

3,011,391
HIGH SPEED PLANE GRATING SPECTROGRAPH AND MONOCHROMATOR
William G. Fastie, Owings Mills, Md., assignor to Jarrell-Ash Company, Newtonville, Mass., a corporation of Massachusetts
Filed July 29, 1959, Ser. No. 830,406
12 Claims. (Cl. 88—14)

This invention relates generally to spectrometric systems, and more particularly it pertains to low $f$/number plane grating spectrographs and monochromators.

There is a need for high aperture spectrographs capable of photographing in a matter of milliseconds, spectra from weak sources, such as shock tube discharges. In addition, there are occasions when extremely weak spectra must be photographed in a reasonable time, for example, the spectra of bioluminescent substances.

While there are several high aperture quartz prism spectrographs with fair dispersion in the far ultra violet portion of the spectrum, and there are many glass, prism or grating spectrographs employing corrected glass lenses which produce fair dispersion in the violet portion of the spectrum, there has been a great need for a high aperture spectrograph with good dispersion and resolution at all wavelengths, with simplicity in the optical arrangement and consequent low cost thereof.

The only existing solutions involving plane gratings, are spectrographs of the well-known Schmidt type, which require expensive aspherical surfaces and highly curved and relatively inaccessible focal planes.

An optical arrangement to provide cancellation of coma which results when aspherical mirrors are used off-axis has been described by Czerny and Turner, in Zeits fur Physik, vol. 61, pp. 792 through 797, March 1930, entitled "Uber den Astigmatismus bei Spiegelspektrometern."

This corrective effect first described by Czerny and Turner explains the perfection of spectra obtained by H. Ebert in his publication Wied. Ann. 38,489 (1889) and more recently described in my U.S. Patent No. 2,750,836, for "Monochromator System for Spectrochemical Analysis," which issued on June 19, 1956.

In the Czeryn-Turner arrangement, a first spherically arranged concave mirror is used at an off-axis angle to render radiant energy passed through an entrance slit thereto parallel and to direct it to a plane grating. The diffracated radiant energy from the plane grating is then passed to an identical second spherically arranged concave mirror which is positioned an equal angle off-axis, that is, is the same angle off-axis as the first concave mirror was off-axis but in the opposite direction therefrom and which focuses the radiant energy from the plane grating onto an exit slit.

The coma aberration, introduced by the fact that the first concave mirror is at an off-axis angle, is cancelled by the fact that the second concaved mirror is at an off-axis angle oppositely as fully described in my patent mentioned above and by Czerny and Turner, also mentioned above.

When the Ebert and Czerny-Turner optical systems are used as spectrographs at a speed ratio of $f/10$, they provide substantially aberration-free spectra. However, previous attempts to adapt these spherical mirror optical systems to spectrographic applications, that is, to provide an optical instrument in which a wide band of spectra can be simultaneously recorded, as, for example, on a photographic plate, or with a multiplicity of photomultiplier tubes, have been unsuccessful.

For example, the spherical mirror spectrograph described in the patent application of William G. Fastie and Richard F. Jarrell, Serial No. 452,416, filed August 26, 1954, entitled "Cross Dispersion Photographic Spectrometer," employs a speed ratio of $f/30$.

The investigation which led to the present invention involved an attempt to produce an $f/6.5$ spectrograph in which the symmetry of the Czerny-Turner optical system was employed in an attempt to correct coma at the center of the spectrum, that is, the exit slit was removed and a photographic plate was placed in the focal plane of the second concave mirror, with the center point of the photographic plate being arranged at the position prescribed for the center point of the exit slit by the teachings of Czerny and Turner.

In order to provide space for an extended focused spectrum in which the photographic plate was placed and in order to further provide light baffles so that no radiant energy scattered by the first concave mirror could reach the photographic plate, it was found necessary to employ the concave mirrors much further off-axis than is necessary when the Czerny-Turner optical system is used as a monochromator. In addition, it was necessary to employ a second concave mirror which was larger in diameter than the first concave mirror in order to collect a wide band of diffraction radiation from the plane grating.

With the above-described Czerny-Turner spectrograph, it was found that, contrary to the teachings of Czerny and Turner, the sharpest spectrum, i.e., the coma free point in the spectrum, was not positioned at the center of the photographic plate as mentioned above but instead was positioned near one end of the plate; that there was significant coma at the center of the plate; and that the coma at the other end of the plate was about twice as large as the coma at the center of the plate.

It was further found experimentally that the off-axis angle of the first concave mirror could be adjusted to bring the coma corrected point to the center of the photographic plate. In addition, the comas at the ends of the photographic plate were approximately equal and approximately one-half as great as the coma observed at one end of the plate with the symmetrical optical system of Czerny and Turner.

The resulting aspherical optical system constitutes the present invention and represents an improvement of a factor of two (2) over the previously described optical system of Czerny and Turner. A further consequence of the experimental work is the provision of a high speed monochromator and/or an illuminator and/or spectrograph.

It is, therefore, an object of this invention to provide an improved optical system for minimizing coma in a spectrograph and/or monochromator of large aperture, and which gives high resolution of spectra over a broad spectral band.

Another object of this invention is to provide an improved optical instrument which will give maximum brightness of spectra in a spherical optical system spectrograph using a plane diffraction type grating.

Still another object of this invention is to provide a unique optical system which will give a broad high energy level spectrum for color illumination.

And yet other objects of this invention are to provide a compact, efficient, wide-range, flexible spectroscopic instrument which is economical and easy to manufacture.

Still another object of this invention is to provide a plane grating spectrographic type instrument which offers high speed and light-gathering power in both the ultraviolet spectrum as well as the visible spectrum.

And even another object of this invention is to provide a plane grating spectrographic type instrument which has wide wavelength coverage at moderate dispersion and resolution.

Even another object of this invention is to provide a plane grating spectrograph having means incorporated therein for rotation of the plane grating to cause a change in the wavelength range.

To provide a plane grating spectrograph which gives a flat focal field external to the spectrograph, thus permitting the use of drum or other high speed cameras, is still another object of this invention.

Another object of this invention is to provide a plane grating spectrograph in which the gratings are readily interchangeable, thus providing different dispersion and wavelength coverage.

These and other objects and advantages of this invention, therefore, will become more readily apparent and understood from the accompanying specification and drawings in which.

Figure 1:
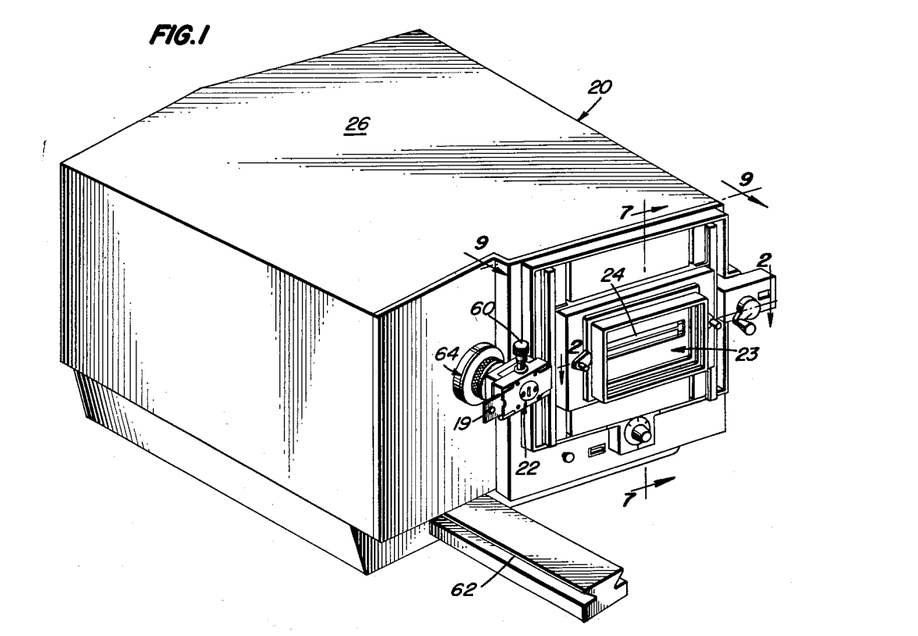
FIG. 1 is a perspective drawing of an improved plane grating type spectrograph incorporating features of this invention.
Figure 3:
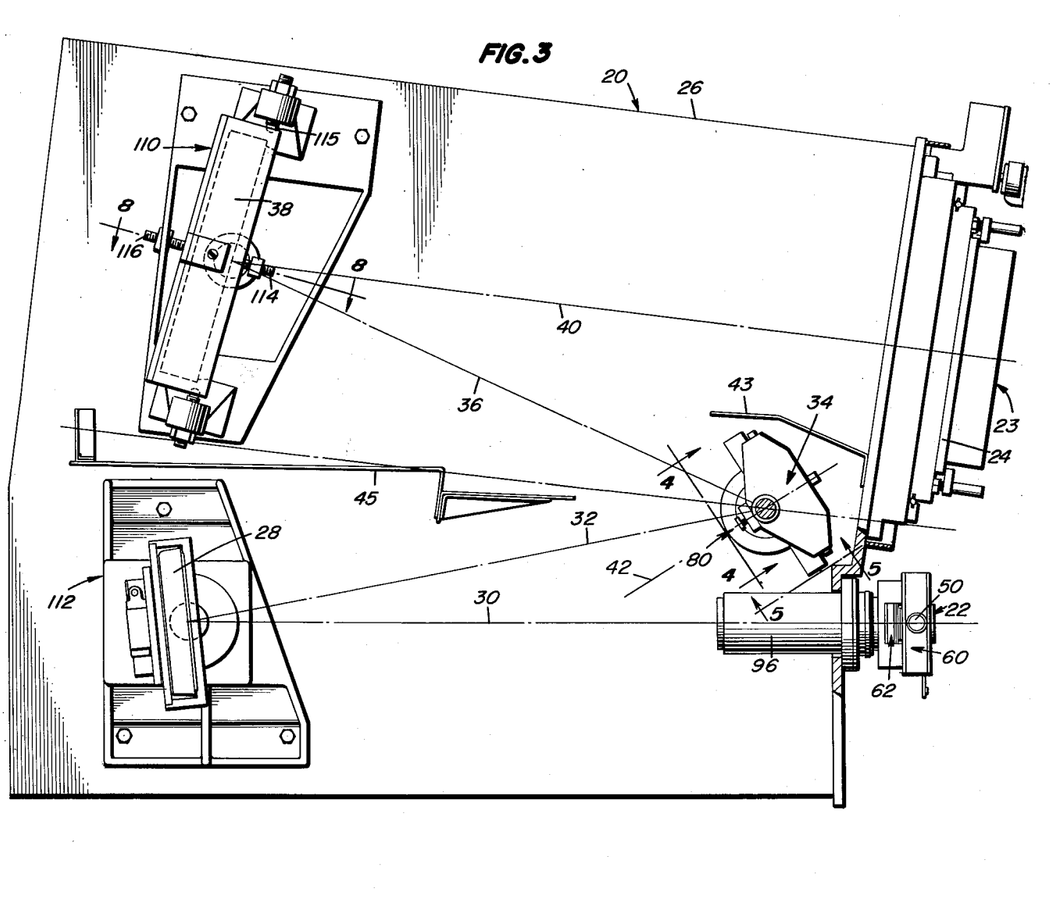
FIG. 3 is a plan view of the spectrograph of FIG. 1, with the cover removed to show the optical arrangement thereof.

Referring now to FIGS. 1 and 3 of the drawings, an improved plane grating type spectrograph is indicated generally by reference numeral 20. This spectrograph 20 is housed in a sturdy steel and aluminum, light-tight housing 26 of substantially rectangular shape. In common with the usual spectrographic instruments, the improved spectrograph 20 is provided with a conventional entrance slit 22, and a cassette structure 23 (not forming part of this invention) positioned in an image plane or focal plane in the forward face of the housing 26, which is normally occupied by an exit slit as illustrated and described in my U.S. Patent No. 2,750,836. Both the entrance slit 22 and cassette structure 23 will be described more in detail subsequently.

Entrance slit 22 is arranged to be bilaterally adjustable by a rotatable member 50, and it is designed to read to $2\mu$ directly. Such a bilaterally adjustable slit arrangement is described in another patent application of mine entitled "Slit Mechanisms," filed jointly with Henry M. Crosswhite, Jr., Serial No. 434,204, on June 3, 1954, now Patent No. 2,914,987, issued December 1, 1959. In addition, entrance slit 22 is arranged to open from $5\mu$ to $500\mu$.

Figure 10:
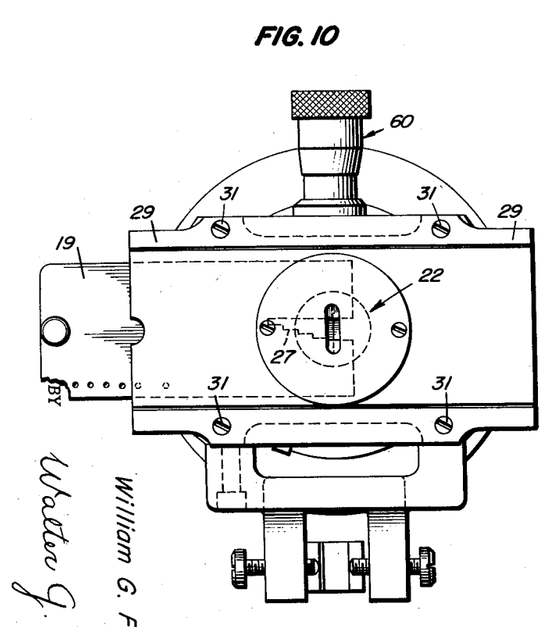
FIG. 10 is an enlarged end view of the entrance slit and related components of FIG. 1.

If desirable, the spectrograph 20 can be provided with a slit holder and a plurality of interchangeable fixed slits, say of $15\mu$, $25\mu$, and $40\mu$ widths. If desirable, the slit height can be varied by moving a fishtail 27 in a member 19 positioned between the slit housing and a cover plate 29 secured thereto by screws 31, shown best in FIG. 10. This fishtail 27 is provided in the member 19 for the entrance slit 22 for limiting the height of the slit. A comparison prism (not shown) mounted in a tube (not shown), which can be raised into position with the entrance slit 22, is used to project a reference spectrum from a separate radiant energy source beside the unknown radiant energy source to be analyzed.

An optical bench or track 62, secured to the underside of the housing 26, as best shown in FIG. 1, can be utilized to mount the unknown radiant energy source and the other optical elements for use with the unknown radiant energy source. For example, a cross dispersion spectrometer arrangement as disclosed in my copending patent application invented jointly with Richard F. Jarrell entitled "Cross Dispersion Photographic Spectrometer," Serial Number 452,416, filed August 26, 1954, may be mounted on the optical bench or track 62 for focusing cross dispersed radiant energy along the entrance slit 22.

In addition to the above, an $f/1.5$ fused quartz condensing lens (not shown) of 98 mm. focal length can be used, if desirable, to focus an enlarged image of the unknown source on the entrance slit 22 of the spectrograph 20.

A shutter arrangement 62 is positioned just behind the entrance slit 22, as shown best in FIGS. 1, 3, 10 and 11. This shutter arrangement 62 can be arranged to be electrically tripped, and is provided with a manually reset cock lever. In one preferred embodiment of the spectrograph 20 of the $f/6.5$ type, the exposure settings of the shutter 64 are $\frac{1}{400}$, $\frac{1}{200}$, $\frac{1}{100}$, $\frac{1}{50}$, $\frac{1}{20}$, $\frac{1}{10}$, $\frac{1}{5}$, $\frac{1}{2}$, 1 second, "Time" and "Bulb."

If desirable, the shutter arrangement 62 may be actuated either by a push button located on the front of the housing 26 of the spectrograph 20 about the entrance slit 22 or by remote control for which a connection is provided on the instrument. If actuated by remote control, power for the shutter arrangement 62 is provided by a 4½ volt battery. Also, the shutter arrangement 62 may be provided with a manual mechanism for opening it, for preliminary alignment thereof, or whenever it is not convenient to use electrical actuation of the shutter arrangement 62.

A conventional focusing arrangement 64, with a scale 65, can be provided for focusing the entrance slit 22 with respect to the first spherically shaped concave mirror 28, shown in FIG. 3.

Figure 16:
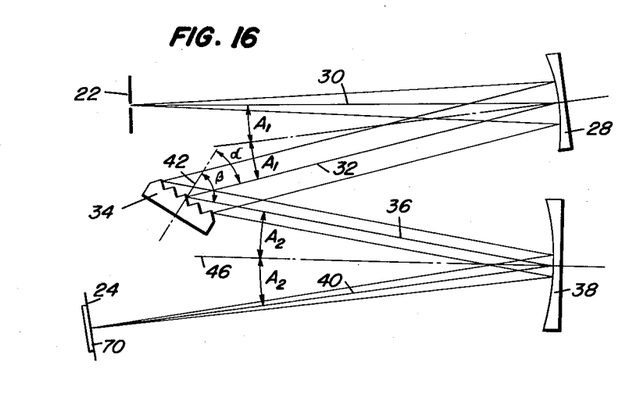
FIG. 16 is a ray diagram illustrating the optical geometry of the improved spectograph of FIGS. 1 and 3.

Within the light-tight housing 26, as shown best in FIG. 3, there is provided a first, spherically shaped concave collimating mirror 28 to centrally intercept the radiant energy, as indicated by ray 30 in FIGS. 3 and 16, from a suitable source of radiant energy, admitted into the spectrograph 20 by the entrance slit 22. A plane ruled reflection type diffraction grating 34 is located in the spectrograph 20 so as to intercept the collimated radiant energy represented by a central ray 32 from the spherically shaped concave collimating mirror 28.

The central part of the desired portion of the radiant energy of the spectrum diffracted by the plane diffraction grating 34 is represented by a light ray 36. The radiant energy as represented by a ray 36 is made to centrally impinge upon a second larger spherically shaped concave camera mirror 38, which reflects radiant energy as indicated by a light ray 40 directly to the center of the image plane 24. The function of the larger spherically shaped concave camera mirror 38 is to sharply focus an image of the entrance slit 22 at the image plane 24.

Other wavelengths of the spectrum are, of course, diffracted from the plane diffraction grating 34 to either side of a normal 42 thereto and are focused on either side of a photographic plate 70, shown in FIG. 16.

Figure 2:
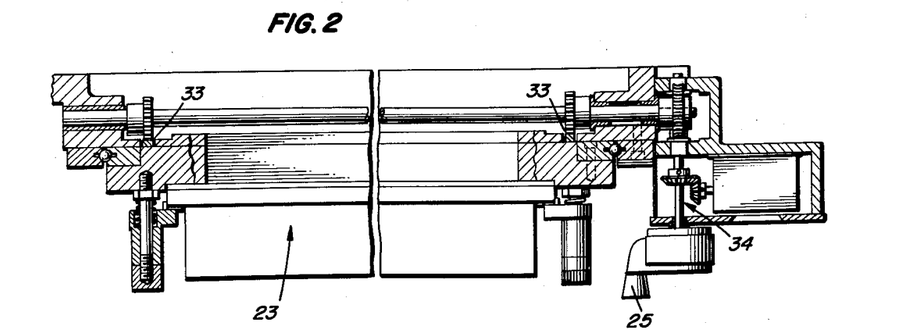
FIG. 2 is a cross-section of a cassette and related components taken along line 2—2 of FIG. 1.
Figure 11:
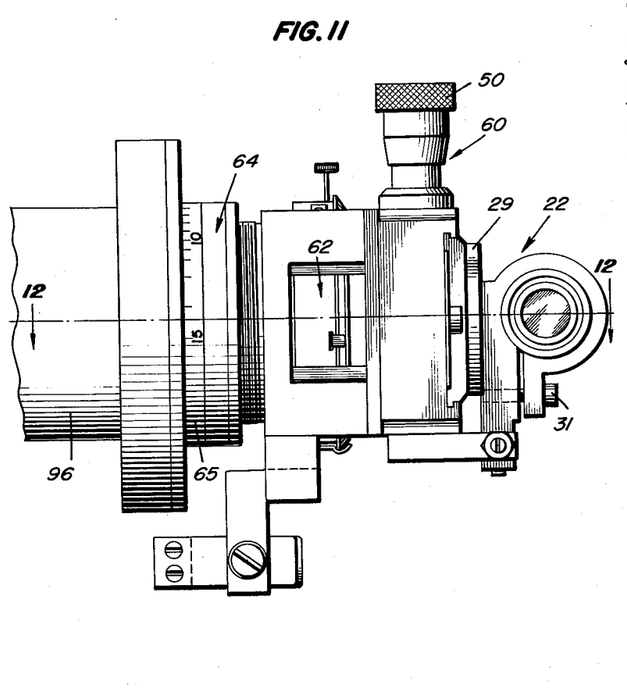
FIG. 11 is an enlarged side view of the entrance slit and related components of FIG. 1.
Figure 12:
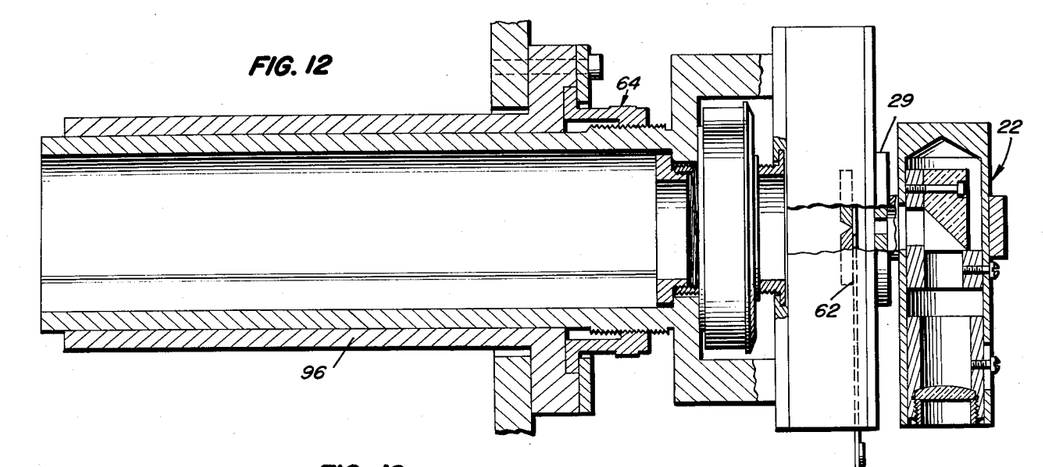
FIG. 12 is a cross section taken along line 12—12 of FIG. 11.

It has been found preferable to position the plane diffraction grating 34 facing in the general direction of the spherically concave collimating mirror 28, as shown in FIG. 3, because such geometry makes more room for positioning the photographic plate 70, shown in FIG. 16, at the image plane 24 of the housing 26. Light baffles 43, 44, and 45 are provided in the spectrograph 20 to protect the image plane or focal plane of the mirror 38 from stray light energy reflected by the spherically concave collimating mirror 28. In addition, the collimating tube 96 for the entrance slit 22, of FIGS. 2, 11, and 12, is used as a light baffle to prevent the incoming radiant energy from passing to the photographic plate 70 or to the focal plane.

Figures 6, 7, 8:
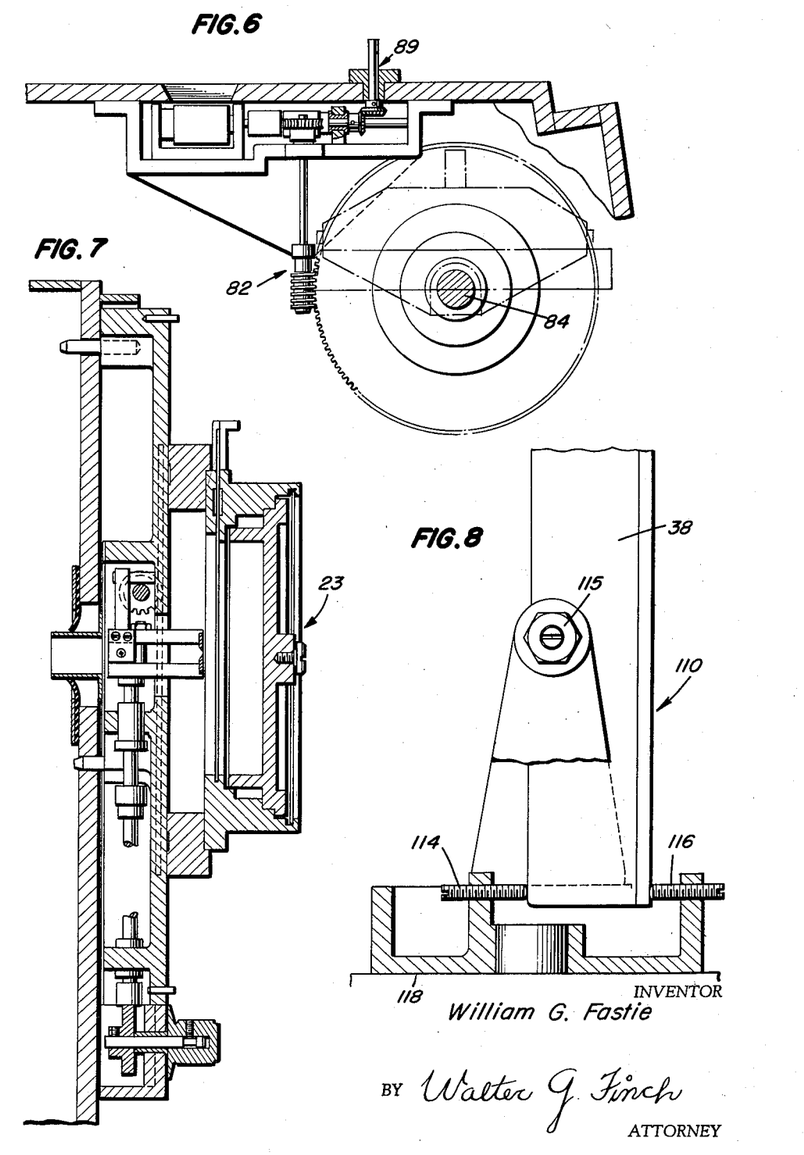
FIG. 6 is a cross-section taken along line 6—6 of FIG. 4.
FIG. 7 is a cross-section taken along line 7—7 of FIG. 1.
FIG. 8 is a side view, partially in cross-section, taken along line 8—8 of FIG. 3, of the mount for the second spherical concaved camera mirror.
Figure 9:
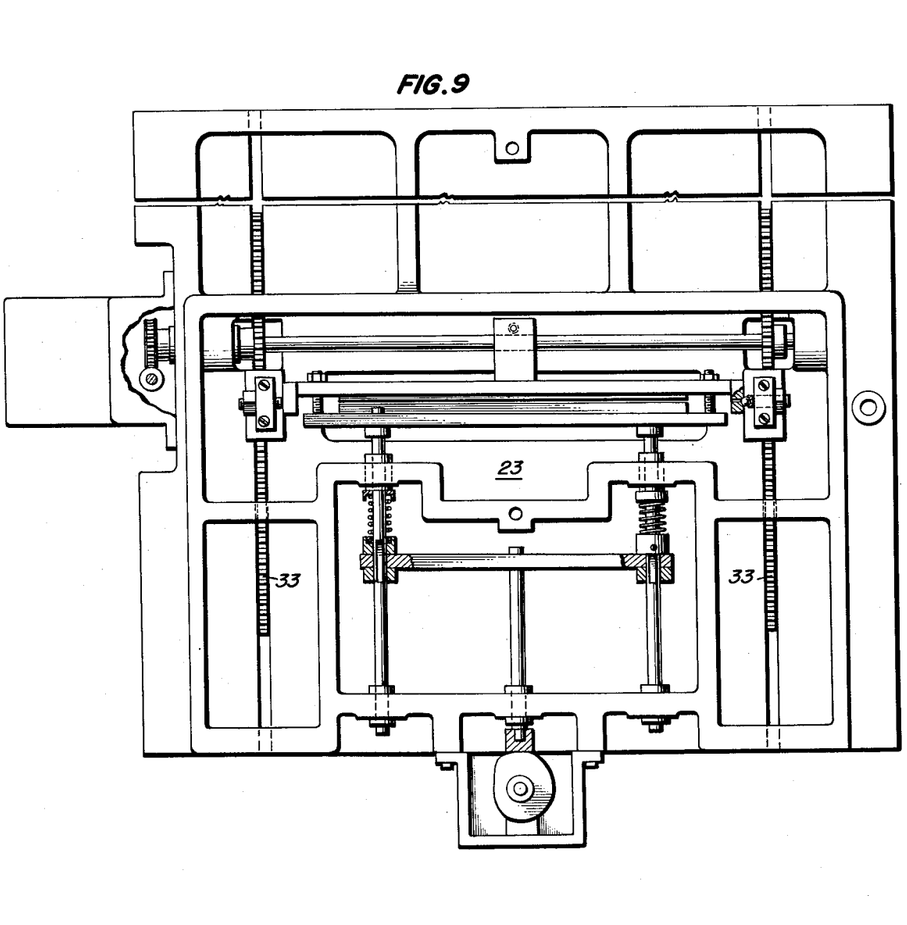
FIG. 9 is an enlarged cross-section taken along line 9—9 of FIG. 1.

As shown best in FIGS. 3 and 8, conventional mount arrangements 110 and 112 are used to support the mirrors 38 and 28, respectively. If desirable, each mirror 28 or 38 can be adjusted by screws 114 and 116 secured to the base 118 about the axis of the shaft 115 of the mount arrangement 110 and 112. In addition, the mount arrangements 110 and 112 can be turned manually on their bases.

Figure 4:
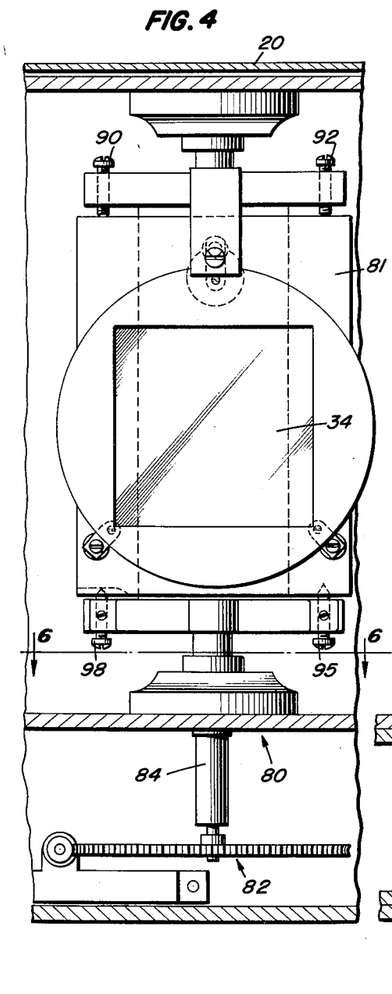
FIG. 4 is a cross-section taken along line 4—4 of FIG. 3 to show the grating and its mount.
Figure 5:
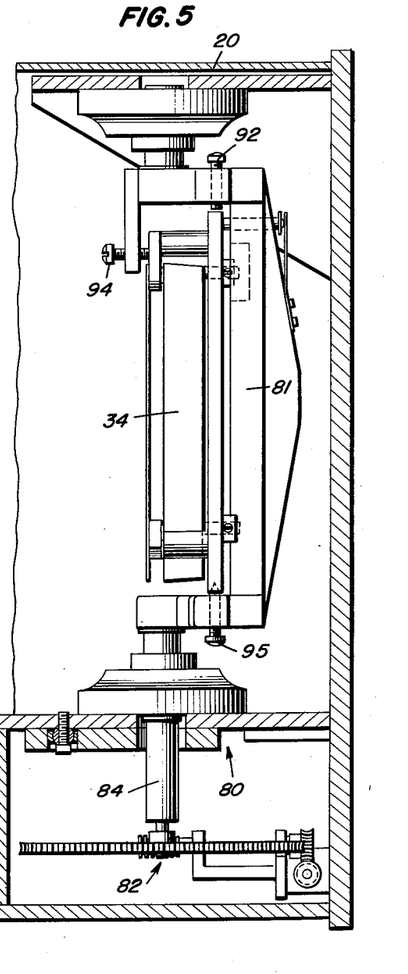
FIG. 5 is a cross-section taken along line 5—5 of FIG. 3 to show the grating and its mount.

It is to be particularly noted that because the spherically concave collimating mirror 28 as well as the spherically concave mirror 38 are achromatic, the only adjustment required to change the wavelength range of the spectrograph 20 is a simple rotation of the plane diffraction grating 34 by rotation of plane grating mount arrangement 80, shown best in FIGS. 4 and 5.

The image of the source of radiant energy, while not completely stigmatic due to aberrations inherent in such a high aperture system, shows far less astigmatism than any concave grating mount. The spectrograph 20 is so designed that various plane diffraction gratings 34 can be used and which are readily interchangeable on the mount 80 to provide different dispersion and wavelength coverage.

The plane diffraction grating 34, as shown in FIGS. 3, 4, 5, and 6, is mounted upon a vertically extending mount or table 81 of a grating mount or table arrangement 80. In order to change the wavelength range, the mount arrangement 80 is arranged to be rotated by a worm and worm gear arrangement 82, operated by a handle 89. Upon rotation of the worm and worm gear arrangement 82, a vertically extending shaft 84 is rotated. This shaft 84 supports the mount or table 81 for the grating 34 so that upon the rotation of shaft 84, mount or tube 81 is rotated to rotate the grating 34.

Suitable adjusting screws 90, 92, 94, 95, and 98, as shown best in FIGS. 4, 5, and 6, can be utilized for adjusting the plane of the plane diffraction grating 34 in the optical system.

A counter can be provided to indicate the setting of the wavelength range in hundredths of a degree. In this connection, a chart is provided which shows the angular setting required to set a desired wavelength at the center of the photographic plate 70.

The previously mentioned cassette structure 23, as shown best in FIGS. 1, 2, 3, 7, and 9, is provided at the front of the spectrograph housing 26 at the image plane 24, and it is arranged to accept either photographic plates 70 or films, of say 5″ x 7″. Since the cassette structure 23 does not form part of this invention, it will only be described generally hereafter. The cassette structure 23 is provided with a substantially flat focal curve. If a film is used in the cassette structure 23, it is held flat against a backing plate by suction which may be obtained either from an aspirator or from a simple mechanical pump. The cassette structure 23 is arranged to be moved in tracks 33 vertically by a rack and pinion arrangement 34 operating by a racking knob 35. A counter is provided to read the position of the cassette structure 23 in millimeters.

In addition, an adjustable diaphragm arrangement can be provided with the cassette structure 23 to limit the light to whatever height of spectrum is being photographed in the spectrograph 20. An externally-operated handle makes it possible to shift the diaphragm to record any desired comparison spectrum.

Since aberrations in a high aperture system build up rapidly with field angle, only 5″ of the 7″ field shows acceptable definition in the spectrograph 20. However, the remaining 2″ of the field may be found useful for some applications, particularly where wide wavelength coverage is desired.

In a typical spectrograph 20 incorporating the features of this invention, the focal length thereof is 750 mm., with a nominal aperture ratio of $f/4.7$ and an effective aperture ratio of $f/7.5$. It is to be noted that the effective aperture ratio of the spectrograph system 20 takes into account only the active area of the rulings on the plane diffraction grating 34 and any obstructions to the entrant or emergent rays of radiant energy. Where there is no obstruction and there is no vignetting of the ruled area of the plane diffraction grating 34 by the focusing elements, the effective $f$/number is given by $f/\overline{D}$, where $$\overline{D} = 2\sqrt{\frac{WH}{\pi}}$$

where W and H are the width and height of the ruled area of the plane diffraction grating 34.

In the present invention, the spectrograph 20 uses a plane diffraction grating 34 of approximately 160 mm. diameter, with a ruled area of 102 mm. x 102 mm. The optical performances for several different plane gratings used in the spectrograph are given as follows:

| | | | | |
|---|---|---|---|---|
| Nominal spacings (grooves/mm.) | 300 | 600 | 1,200 | 2,160 |
| Reciprocal linear dispersion (A.U./mm): | | | | |
| At 2,000 A.U. | 43 | 20.0 | 10.0 | 5.9 |
| At 4,500 A.U. | 44 | 20.5 | 10.3 | 6.2 |
| Wavelength range: In one exposure (over 5″), A.U. | 5,400 | 2,500 | 1,250 | 750 |

With respect to the working resolution of the spectrograph 20, which, as previously pointed out, is a simple high aperture type optical system, there are residual aberrations which reveal themselves in heavy exposures.

As a result, the working resolutions in such spectrographs 20 depend on the exposure level. Another factor is the distance along the photographic plate 70 from the position of minimum aberrations. At the optimum position, the spectrograph 20, of the $f/6.5$ type, will resolve lines with a density of 1.0, which are located 0.4 A.U. apart at a dispersion of 20 A.U./mm. The resolution of the spectrograph 20 will drop to approximately 0.8 A.U. at a density of 2.0. At the extreme edge of the 5″ field used in the spectrograph 20, the resolution is 0.9 A.U. at $d=1.0$ and 2.3 A.U. at $d=2.0$.

Figure 13:
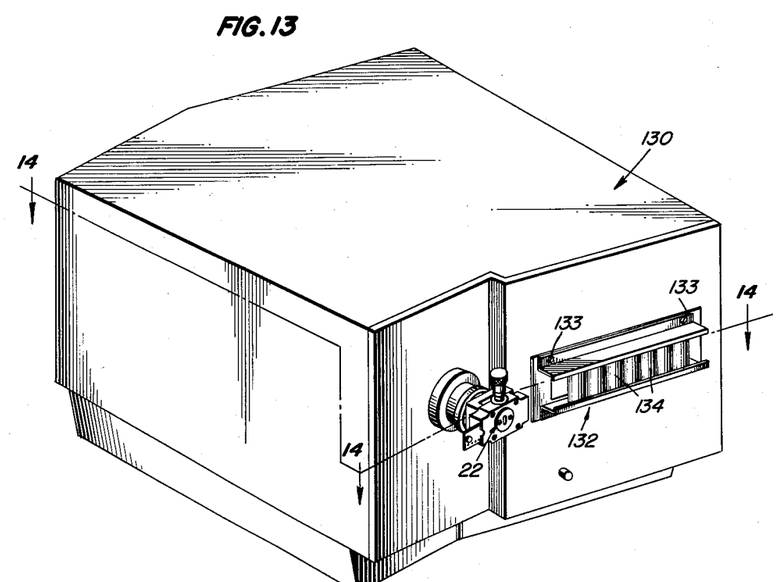
FIG. 13 is a perspective view of a chromatogenous instrument incorporating other features of this invention.
Figure 14:
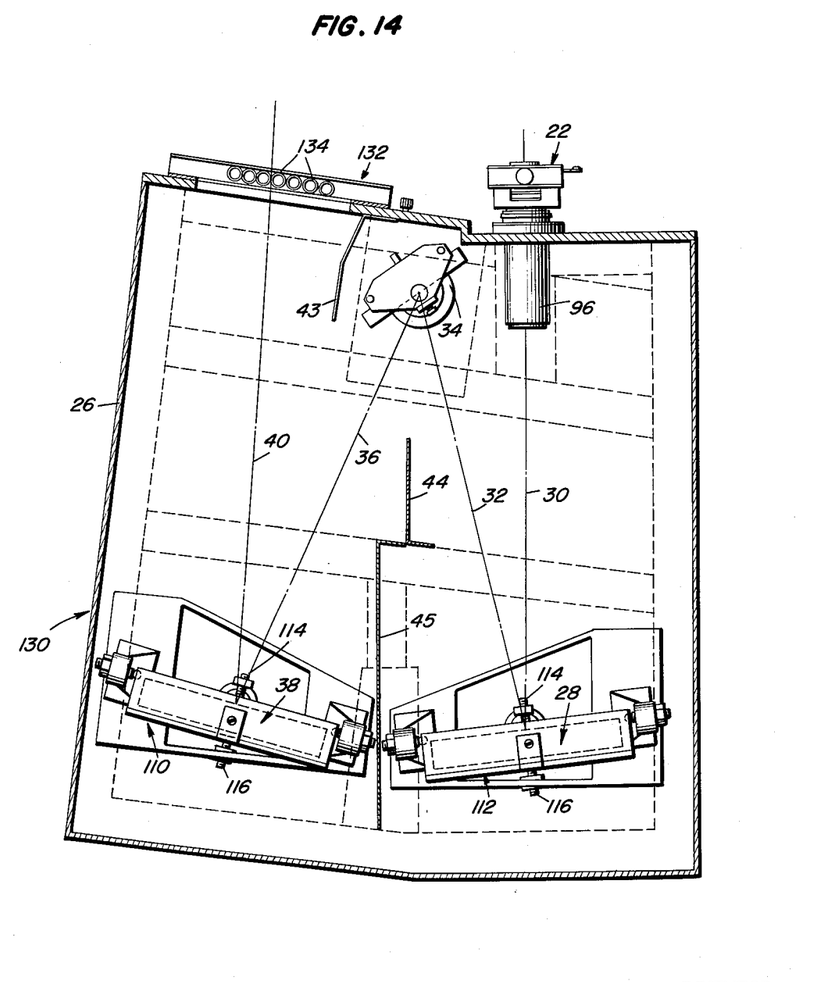
FIG. 14 is a cross section of the chromatogenous instrument of FIG. 13 taken along line 14—14 thereof.

In some instances, it may be desirable to study liquid samples of various types, and to irradiate them with spectral energy, and, additionally to use spherically concave mirrors 28 and 38 of the same or substantially the same diameter. Such an optical system for a spectrometer 130 is shown in FIGS. 13 and 14, wherein instead of using a cassette structure 23, a holder 132 is affixed to the front of the spectrometer 130 in the focal plane previously occupied by the photographic plate 70. This holder 132 is secured to the housing of the spectrometer 130 by screws 133. A plurality of liquid samples in suitable tubes 134 or the like can be positioned in the holder 132 and the radiant energy from the second spherically concave mirror 38 is used to irradiate the liquid samples.

Otherwise, the spectrometer of FIGS. 13 and 14 is identical to that of FIGS. 1 to 12.

Figure 15:
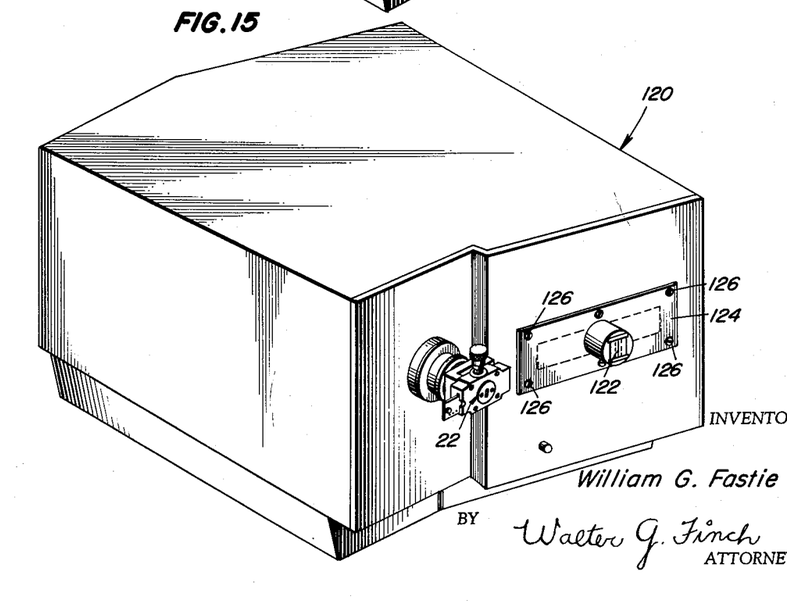
FIG. 15 is a perspective view of a monochromator incorporating features of this invention.

In some cases, it may be desirable to have a monochromator 120 as shown in FIG. 15, wherein an exit slit arrangement 122 is substituted in the focal plane of mirror 38 for the cassette structure 23 or the holder 132 for the previously described spectrograph 20 and chromatogenous instrument 130. The exit slit arrangement 122 is secured to the housing thereof by a plate 124 and screws 126. Otherwise, the monochromator 120 of FIG. 15 is identical to the instruments of FIGS. 1 to 12, and 13 and 14.

The coma error and the technique by which it can be corrected can be understood by considering the mathematical relationships which apply to the coma error and to the plane diffraction grating 34 of FIG. 16.

If the spherically concave mirror 28 is used at an off-axis angle $A_1$ in an attempt to form a parallel beam from a point source at the focal point of the mirror 28, the resultant wave front, if a horizontal plane is considered, which includes the source and the center point of the illuminated portion of the mirror 28 (which is a plane including the central ray of the system), will not be a straight line, but will be oppositely and equally curved at the ends of the wave front.

More specifically, the wave front will be shaped like a flattened letter S, with the center portion of the wave front being perpendicular to the central ray and with the ends of the wave front being parallel to each other.

If the angle between the central portion and the extremities of the wave front is called $\Delta_1$, it is well-known that the magnitude of the angle $\Delta_1$, commonly called the coma error, varies linearly with the magnitude of the off-axis angle $A_1$ and with the inverse square of the $f$ number of the mirror 28, with the $f$ number in this case representing the ratio of the distance between the center point of the mirror 28 and the source, divided by the width of the illuminated portion of the mirror, as stated in Equation 1 below:

$$\Delta_1 = \frac{CA_1}{f_1^2} \quad \text{(Equation 1)}$$

where $C$ is a constant of proportionality and $A_1$ is the off-axis angle of the mirror 28, which is the half angle between the central ray before and after reflection from the concave mirror 28, and $f_1$ is the focal ratio for the concave mirror.

The angle $\Delta_1$ can also be expressed as the angular difference between the rays at the center of the beam and those at the edge thereof. If such a wave front containing rays which are not parallel to each other, falls on the plane diffraction grating 34, they will be diffracted according to the well-known Equation 2 below:

$$n\lambda = a(\sin\alpha + \sin\beta) \quad \text{(Equation 2)}$$

where $n$ is the order number, $\lambda$ is the wavelength, $a$ is the distance between rulings of the grating, $\alpha$ is the angle of incidence, and $\beta$ is the angle of diffraction.

To determine the effect of a small difference in the angle $\alpha$ on the angle $\beta$, Equation 2 can be differentiated in $\alpha$ with respect to $\beta$ which gives Equation 3 below:

$$\cos\alpha\, d\alpha = -\cos\beta\, d\beta \quad \text{(Equation 3)}$$

Equation 3 shows that for a given error in the incident wave front, there is a different error in the diffracted wave front, with the angle $d\alpha$ corresponding to the angle $\Delta_1$. Thus, the error $d\beta$ in the diffracted wave front is given by Equations 4 below which combines Equations 1 and 3, and substitutes $\Delta_1$ for $d\alpha$:

$$d\beta = \frac{-\cos\alpha}{\cos\beta} \cdot \frac{CA_1}{f_1^2} \quad \text{(Equation 4)}$$

Therefore, if the parallel wave front with a coma error of $\Delta_1$ impinges on the plane diffraction grating 34 whose center point is in the above defined plane in such a way that the angle between the central ray and the normal to the grating 34 (the normal also being in the above-defined plane) is the angle $\alpha$, the central diffracted ray which makes an angle $\beta$ with the grating normal will exhibit a coma error of magnitude $d\beta$ according to Equation 4.

The angles $\alpha$ and $\beta$ are both positive when they are on the same side of the above defined normal. If, as is the usual and desirable case, the diffraction grating 34 is the optical element which determines the width of the wave front, the width of the incident wave front and consequently the $f$ number $f_1$ will vary according to the cosine of the angle and Equation 4 can be revised to Equation 5 below:

$$d\beta = \frac{W^2 \cos^3\alpha}{f^2 \cos\beta} \cdot CA_1 \quad \text{(Equation 5)}$$

where $W$ is the width of the plane diffraction grating 34.

The diffracted rays from the grating 34 fall on the second spherically concave mirror 38 which has its central axis in the above-defined plane and which focuses the wave front diffracted from the mirror 38 at the angle $\beta$ at a point in the focal plane of the mirror, such that the angle between the diffracted beam and the focused beam is $2A_2$, that is, the mirror is off-axis by the angle $A_2$, and, therefore, produces a coma error, according to the earlier analysis, as given by Equation 6 below:

$$\Delta_2 = \frac{CA_2}{f_2^2} \quad \text{(Equation 6)}$$

where $C$ is the earlier defined constant, and $f_2$ is the $f$ number of the second mirror 38 corresponding to $f_1$ for the first mirror 28.

According to the above-mentioned assumptions, $f_2 = W \cos\beta$, and Equation 6 becomes Equation 7 below:

$$\Delta_2 = \frac{CA_2 W^2}{f^2} \cos^2\beta \quad \text{(Equation 7)}$$

If the coma produced by the first mirror 28 and as modified by the grating 34 is to be corrected by the second mirror 38, $\Delta_2$ of Equation 7 must equal $d\beta$ of Equation 5. Thus, the coma correcting condition is given by Equation 8 below:

$$\frac{A_1}{A_2} = \frac{\cos^3\beta}{\cos^3\alpha} \quad \text{(Equation 8)}$$

It is to be noted that it is possible to operate the spectrograph 20 of the present invention in such a manner that the entrance slit 22 is not always located in the focal plane of the first spherically concave mirror 28, but is either located inside or outside of the focal plane thereof, with an adjustment in the spectrum formed by the second spherically concave mirror, that is, it will be located either outside or inside, respectively, of the focal plane 24 of the second spherically concave mirror 38.

However, the relationship of the angles $A_1$ and $A_2$ will differ only slightly from the ratio $\cos^3\beta$ to $\cos^3\alpha$, so that some other modified mathematical relationship will apply, but all of which is still within the scope of this invention.

Obviously, many other modifications and variations of the present invention are possible in light of the above teachings. It is, therefore, to be understood that within the scope of the appended claims the invention may be practised otherwise than as specifically described.

What is claimed is:

1. A spectrometric optical system, comprising, an entrance slit, a first spherically concave mirror disposed to receive divergent rays of radiant energy from said entrance slit, said entrance slit being positioned in the focal plane of said first mirror, a diffraction grating, said first concave mirror being arranged at an off-axis angle $A_1$ to render said divergent rays of radiant energy parallel for incidence upon said diffraction grating except for coma aberrations introduced by said first concave mirror, a second spherically concave mirror arranged at an off-axis angle $A_2$ to receive said diffracted rays of radiant energy from said diffraction grating and to reflect said rays of radiant energy and focus them to form a spectral image of said rays of radiant energy in the focal plane of said second concave mirror, said first mirror and entrance slit being located on the same side of a line passing through the center point of said diffraction grating and bisecting a second line passing between the centerpoints of said first and second concave mirrors, and means including at least one photographic plate having its center point positioned at the center point of the focal plane of said second concave mirror, so that for a given diffraction grating of given dimensions set for a given spectral range $A_1$ is a function of $KA_2$, with the value of K depending upon the characteristics of said diffraction grating, and the dimensions and wave length employed by said diffracting grating.

2. A spectrometric optical system, comprising, an entrance slit, a first spherically concave mirror disposed to receive divergent rays of radiant energy passed through said entrance slit, said entrance slit being positioned in the focal plane of said first spherically concave mirror, a plane diffraction grating, said first concave mirror being arranged to render said divergent rays of radiant energy parallel for incidence upon said diffraction grating except for coma aberrations introduced by said first concave mirror, and a second spherically concave mirror arranged to receive said diffracted rays of radiant energy from said diffraction grating and to reflect said rays of radiant energy and focus them to form a spectral image of the source of said rays of radiant energy in the focal plane of said second concave mirror, said first mirror and entrance slit being located on the same side of a line passing through the center point of said diffraction grating, and bisecting a second line passing between the center points of said first and second concave mirrors, with said second concave mirror and said spectral image being positioned on the opposite side of said line, with the center point of said spectral image, the center point of said entrance slit, the center point of said diffraction grating, and the center points of said two concave mirrors lying in a common plane, with the off-axis angles $A_1$ and $A_2$ of said first and second concave mirrors, respectively, depending upon the characteristics of said diffraction grating, and the angle at which said diffraction grating is used.

3. A spectrometric optical system, comprising, structure defining an entrance slit, means including a first mirror disposed to receive divergent rays of radiant energy passed through said entrance slit, said entrance slit being positioned in the focal plane of said first mirror, a diffraction grating, said first mirror being arranged at an off-axis angle $A_1$ to render said divergent rays of radiant energy parallel for incidence upon said diffraction grating at an incidence angle $\alpha$ to a normal passing through the face of said diffraction grating except for coma aberrations introduced by said first mirror, and means including a second mirror arranged at an off-axis angle $A_2$ to receive said diffracted rays of radiant energy from said diffraction grating at a diffraction angle $\beta$ at the central portion of said second mirror and to reflect and focus said rays of radiant energy to form a spectral image of said rays of radiant energy in the focal plane of said second mirror, said first mirror and entrance slit being located on the same side of a line passing through the center point of said diffraction grating and bisecting a second line passing between the center points of said first and second mirrors, with said second mirror and its focal plane being positioned on the opposite side of said line so that angle $A_1$ is to angle $A_2$ as $\cosine^3 \beta$ is to $\cosine^3 \alpha$.

4. A spectrometric optical system, comprising, structure defining an entrance slit, a first spherically concave mirror disposed to receive divergent rays of radiant energy passing through said entrance slit, said entrance slit being positioned in the focal plane of said first concave mirror, a diffraction grating, said first concave mirror being arranged at an off-axis angle $A_1$ to render said divergent rays of radiant energy parallel for incidence upon said diffraction grating at an incidence angle $\alpha$ to a normal passing through the face of said diffraction grating except for coma aberrations introduced by said first concave mirror, and a second spherically concave mirror arranged at an off-axis angle $A_2$ to receive said diffracted rays of radiant energy from said diffraction angle $\beta$ at the central portion of said second concave mirror and to reflect and focus said rays of radiant energy to form a spectral image of said rays of radiant energy in the focal plane of said second concave mirror, said first concave mirror and entrance slit being located on the same side of a line passing through the center point of said diffraction grating and bisecting a second line passing between the center point of said first and second concave mirrors with said second concave mirror and its focal plane being positioned on the opposite side of said line so that angle $A_1$ is to angle $A_2$ as $\cosine^3 \beta$ is to $\cosine^3 \alpha$.

5. A spectrometric optical system as recited in claim 4, and structure defining a second slit positioned at the center of said focal plane of said second concave mirror.

6. A spectrometric optical system as recited in claim 4, and means including a photographic plate having its center point positioned at the center of said focal plane of said second concave mirror.

7. A spectrometric optical system as recited in claim 4, and a plurality of photomultiplier tubes positioned in the focal plane of said second concave mirror.

8. A spectrometric optical system as recited in claim 4, and means for inserting a series of samples into the focal plane of said second spherically concave mirror for irradiation thereof.

9. A spectrometric optical system as recited in claim 4, wherein said second concave mirror is of larger diameter than said first spherically concave mirror.

10. A spectrometic optical system as recited in claim 4, and means for rotating said diffraction grating to cause a change in wavelength range thereof.

11. A spectrometric optical system as recited in claim 4, wherein the focal lengths of said concave mirrors are equal.

12. A spectrometric optical system as recited in claim 11, wherein the perpendicular distance between the center point of said diffraction grating and a line connecting the center point of said entrance slit and the center point of said spectral image formed by said second concave mirror is equal to approximately twenty percent of the focal length of either of said concave mirrors.

References Cited in the file of this patent

UNITED STATES PATENTS

| | | |
|---|---|---|
| 2,114,472 | Kopfler | Apr. 19, 1938 |
| 2,339,053 | Coleman | Jan. 11, 1944 |
| 2,750,836 | Fastie | June 19, 1956 |
| 2,874,608 | Beloian | Feb. 24, 1959 |

UNITED STATES PATENT OFFICE
CERTIFICATE OF CORRECTION

Patent No. 3,011,391                           December 5, 1961

William G. Fastie

It is hereby certified that error appears in the above numbered patent requiring correction and that the said Letters Patent should read as corrected below.

Column 10, line 16, after "diffraction" insert -- grating at a diffraction --.

Signed and sealed this 9th day of June 1964.

(SEAL)
Attest:

ERNEST W. SWIDER
Attesting Officer

EDWARD J. BRENNER
Commissioner of Patents